(12) United States Patent
Palavalli et al.

(10) Patent No.: US 10,832,224 B2
(45) Date of Patent: Nov. 10, 2020

(54) CALENDAR BASED MANAGEMENT OF INFORMATION TECHNOLOGY (IT) TASKS

(71) Applicant: VMWARE, INC., Palo Alto, CA (US)

(72) Inventors: Amarnath Palavalli, Bangalore (IN); Saket Kumar, Bangalore (IN); Ankit Shrivastava, Bangalore (IN); Mohammed Muneebuddin, Bangalore (IN); Mrityunjoy Saha, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 715 days.

(21) Appl. No.: 14/790,020

(22) Filed: Jul. 2, 2015

(65) Prior Publication Data

US 2016/0328683 A1 Nov. 10, 2016

(30) Foreign Application Priority Data

May 6, 2015 (IN) .......................... 2292/CHE/2015

(51) Int. Cl.
*G06Q 10/10* (2012.01)
*G06F 9/48* (2006.01)
*G06Q 10/06* (2012.01)
*H04L 12/26* (2006.01)

(52) U.S. Cl.
CPC ......... *G06Q 10/1097* (2013.01); *G06F 9/485* (2013.01); *G06Q 10/06314* (2013.01); *H04L 43/50* (2013.01)

(58) Field of Classification Search
CPC ......... G06Q 10/1097; G06Q 10/06314; G06Q 10/06313; G06Q 10/1093; G06Q 10/06
See application file for complete search history.

(56) References Cited

U.S. PATENT DOCUMENTS

| 6,397,359 | B1 * | 5/2002 | Chandra | H04L 41/5009 709/224 |
| 6,769,120 | B1 * | 7/2004 | Rodriguez | G06Q 10/109 718/100 |
| 8,676,937 | B2 * | 3/2014 | Rapaport | H04N 21/8358 709/219 |
| 8,863,021 | B1 * | 10/2014 | Bee | G06Q 10/109 715/780 |
| 9,798,596 | B2 * | 10/2017 | Vibhor | G06F 9/4881 |
| 10,142,276 | B2 * | 11/2018 | Rapaport | H04L 51/32 |

(Continued)

FOREIGN PATENT DOCUMENTS

| CN | 102209100 A | * | 10/2011 |
| CN | 103019849 A | * | 4/2013 |

OTHER PUBLICATIONS

English Translation of Chinese Patent CN-103019849.*
English Translation of Chinese Patent CN-102209100.*

*Primary Examiner* — Tyler W Knox

(57) ABSTRACT

Techniques for providing a calendar based provisioning and management for IT administrator/user activities in a virtual datacenter is described. In one example embodiment, an IT task is scheduled as a calendar appointment using an at least one registered calendar application residing in a user device. The at least one registered calendar application is then monitored for the scheduled IT task. The scheduled IT task is then translated into an action/command based on the outcome of the monitoring. The action/command is then issued to manage the scheduled IT task in the datacenter/ cloud.

9 Claims, 5 Drawing Sheets

(56) References Cited

U.S. PATENT DOCUMENTS

| | | | |
|---|---|---|---|
| 2009/0089133 A1* | 4/2009 | Johnson | G06Q 10/109 705/7.21 |
| 2009/0300607 A1* | 12/2009 | Ferris | G06F 9/45558 718/1 |
| 2010/0281095 A1* | 11/2010 | Wehner | G06F 9/5072 709/201 |
| 2011/0167105 A1* | 7/2011 | Ramakrishnan | G06Q 10/10 709/203 |
| 2012/0016943 A1* | 1/2012 | Greenberg | G06Q 10/06 709/206 |
| 2012/0023223 A1* | 1/2012 | Branch | G06F 9/4856 709/224 |
| 2012/0159506 A1* | 6/2012 | Barham | G06F 9/5066 718/104 |
| 2012/0290950 A1* | 11/2012 | Rapaport | H04N 21/8358 715/753 |
| 2013/0097659 A1* | 4/2013 | Das | H04W 12/08 726/1 |
| 2013/0103816 A1* | 4/2013 | Morley | G06F 9/541 709/223 |
| 2013/0173918 A1* | 7/2013 | Saraswat | H04L 41/02 713/167 |
| 2013/0191836 A1* | 7/2013 | Meyer | G06F 9/4881 718/103 |
| 2013/0254880 A1* | 9/2013 | Alperovitch | G06F 21/51 726/22 |
| 2013/0332213 A1* | 12/2013 | Heggen | G06Q 10/101 705/7.15 |
| 2014/0052667 A1* | 2/2014 | Lundberg | G06Q 50/184 705/36 R |
| 2014/0074850 A1* | 3/2014 | Noel | G06F 11/0709 707/741 |
| 2014/0215479 A1* | 7/2014 | Riemers | G06F 9/4881 718/103 |
| 2014/0229610 A1* | 8/2014 | Shen | G06F 9/505 709/224 |
| 2014/0325503 A1* | 10/2014 | Li | G06F 11/3433 717/177 |
| 2014/0344718 A1* | 11/2014 | Rapaport | H04L 51/32 715/753 |
| 2014/0379388 A1* | 12/2014 | Lundberg | G06F 16/338 705/4 |
| 2015/0154566 A1* | 6/2015 | Saxena | G06Q 10/1095 705/7.19 |
| 2015/0244775 A1* | 8/2015 | Vibhor | G06Q 10/00 709/203 |
| 2015/0324751 A1* | 11/2015 | Orenstein | G06F 19/3481 702/3 |
| 2015/0363733 A1* | 12/2015 | Brown | G06Q 10/10 705/7.26 |
| 2016/0086290 A1* | 3/2016 | Blake | G06Q 50/01 705/7.29 |
| 2016/0180272 A1* | 6/2016 | Richards | G06Q 10/06314 705/7.24 |
| 2016/0259761 A1* | 9/2016 | Laborczfalvi | G06F 16/23 |

* cited by examiner

CALENDAR BASED MANAGEMENT OF INFORMATION TECHNOLOGY (IT) TASKS

RELATED APPLICATIONS

Benefit is claimed under 35 U.S.C. 119(a)-(d) to Foreign application Serial No. 2292/CHE/2015 filed in India entitled "CALENDAR BASED MANAGEMENT OF INFORMATION TECHNOLOGY (IT) TASKS", on May 6, 2015, by VMware, Inc., which is herein incorporated in its entirety by reference for all purposes.

BACKGROUND

Information Technology (IT) administrators/users often find themselves servicing urgent acid repetitive requests to create deployment environments having pre-specified configurations. Cloud automation and provisioning products, such as VMware®, vRealize Automation® and the like, that lend themselves in creation and deployment of virtual machines with pre-specified configurations easily. Typically, this may be achieved by allowing IT administrators to model application blueprints based on desired configuration and then deploying them rapidly based on the demand. However, IT administrators may encounter any problems, while creating deployment environments, such as serving repeated requests for a same kind of temporary service deployments, serving these machine deployment requests at odd time of days without having access to VPN (Virtual Private Network), forgetting to cleanup resources associated with earlier deployed resources that are not needed, no-longer-used machine environments leading to inefficient use of the data center resources, and handling repeated pre-set scale-out and scale-in configurations based on known date patterns. For example, if it is known that load on a reports application increases every month-end, IT administrators may get repeated requests to increase the capacity during month-end and then to reverse the capacity increase after few days when the deployed increased capacity is no longer needed.

SUMMARY

One or more embodiments disclosed herein provide a calendar based management for IT administrator/user activities. In one aspect, the method includes scheduling a IT task as a calendar appointment using an at least one registered calendar application residing in a user device in the datacenter/cloud, monitoring the at least one registered calendar for the scheduled IT task created as a calendar appointment, translating the scheduled IT task into an action/command based on the outcome of the monitoring, and issuing the action/command to manage the scheduled IT task in the datacenter/cloud.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps of providing a calendar based provisioning and management for IT administrator/user activities.

Embodiments of the present disclosure provide a computer system. The computing system includes multiple host computing systems in a datacenter/cloud. Further, the computing system includes at least one user device including a calendar application. Furthermore the computing system includes a network that is communicatively coupled to the multiple host computing systems. Moreover, the computing system includes a management server that is communicatively coupled to the network, wherein the management server includes to virtual management software, which further includes a calendar based IT task scheduling module and each of the multiple host computing systems includes an calendar based IT task scheduling module, wherein the IT calendar based task scheduling module is configured to provide a calendar based provisioning and management for IT administrator/user activities.

DETAILED DESCRIPTION

Examples described herein provide enhanced methods, techniques, and systems for a calendar based provisioning and management for IT administrator/user activities (e.g., IT tasks). In one example, the technique is based on an approach based on an access-anywhere calendar (e.g. Google Calendar™). The technique increases efficiency and simplifies scheduling capabilities for repetitive tasks to IT administrators. This may free-up IT administrators' time to allow them to focus on other needed tasks. In one example implementation, the feature is made available to non-virtual private network (VPN) environments and with mobile-friendly features. Further, the technique can help the IT administrators to process urgent requests remotely. Furthermore, automatic scheduling of deletion of unused environments will ensure resources are released to the cloud in time and lead to better utilization of datacenter resources. Also, the proposed technique provides scheduled capacity-increases (scale-out) and capacity-decreases (scale-in) of already-running application deployments. In another example, one-time as well as recurring IT tasks may be supported thus providing for one-time scheduling, of repetitive IT tasks. In addition, the proposed technique may be extensible and can be enhanced to include customized use-cases if the proposed technique is integrated with a workflow system like VMware® vCenter Orchestrator (vCO)®. Moreover, the technique simplifies management of IT tasks by allowing users to visualize the recurring IT tasks like generation of reports based on recurring calendar entry. In another example, the proposed technique provides an option to email or store the reports in remote file server for later use. Also, integration of calendar with a public cloud like VMware® vCloud Air® can provide a powerful mechanism for users to manage their hybrid cloud, infrastructure. Further, the technique uses already-familiar calendar Apps and or available calendar Apps on devices, such as desktops and mobile devices to reduce learning curve.

System Overview and Examples of Operation

Figure 1:
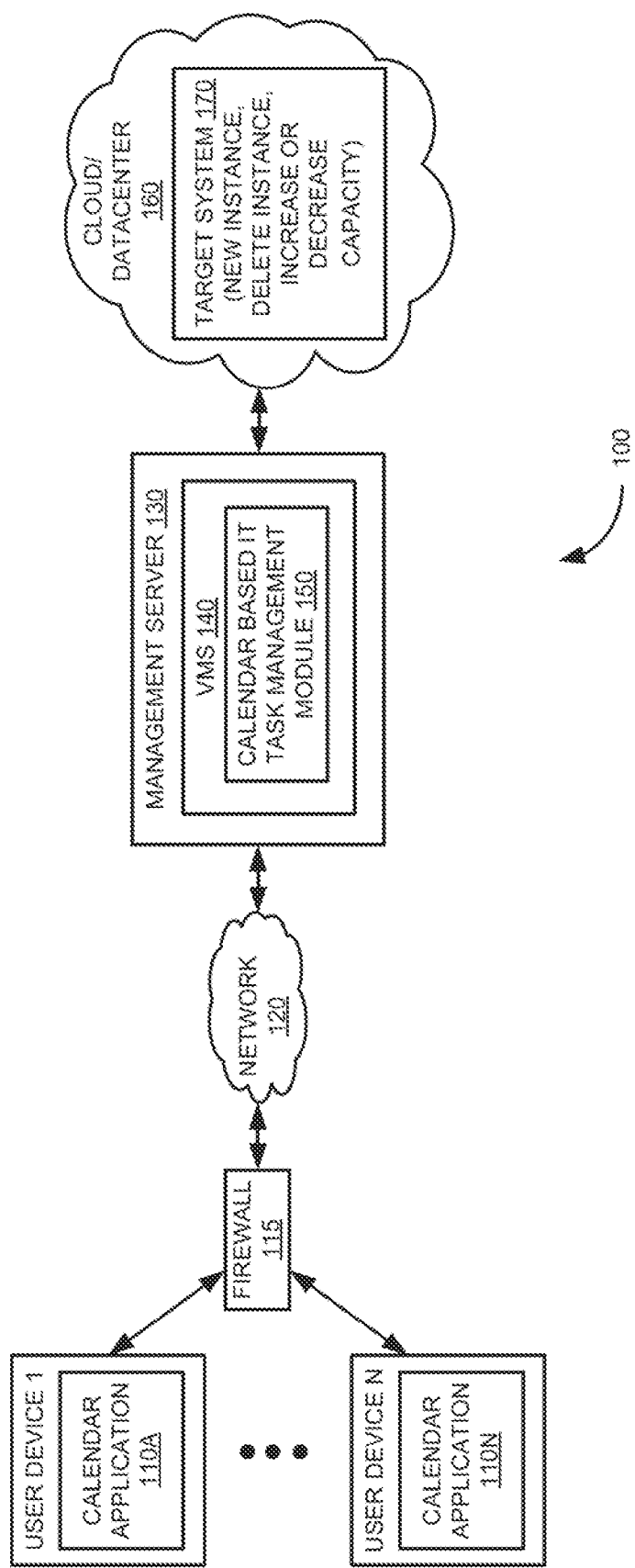
FIG. 1 is a block diagram illustrating system for providing, a calendar based provisioning, and management for IT administrator/user activities (i.e., IT tasks), according to an example embodiment.

FIG. 1 is a block diagram illustrating a system 100 for providing a calendar based management of IT tasks in a datacenter/cloud 160, according to an example embodiment. In some embodiments, datacenter may b a virtual datacenter and cloud may be a virtual cloud computing system. Virtual datacenter may include multiple host computing systems and associated virtual machines (VMs) hosted by the multiple host computing systems in a failover clusters. Multiple host computing systems may include associated failover agents. Each of multiple host computing systems may be connected to the shared storage network. As shown in FIG. 1, system 100 includes calendar applications 110A-N residing in associated user devices 1-N. It can be envisioned that the calendar applications 110A-N may reside in user devices 1-N that are located within an organization's firewall 115 and/or outside an organization's firewall. Also as shown in FIG. 1, system 100 includes management server 130 that is communicatively coupled to user devices 1-N via network 120. Further as shown in FIG. 1, management server 130 includes virtual management software (VMS) 140, which in turn includes calendar based IT task management module 150. In addition, as shown in FIG. 1, management server 130 is coupled to datacenter/cloud 160 including a target system 170. Example target system is a computing system, storage device and the like.

Figure 2:
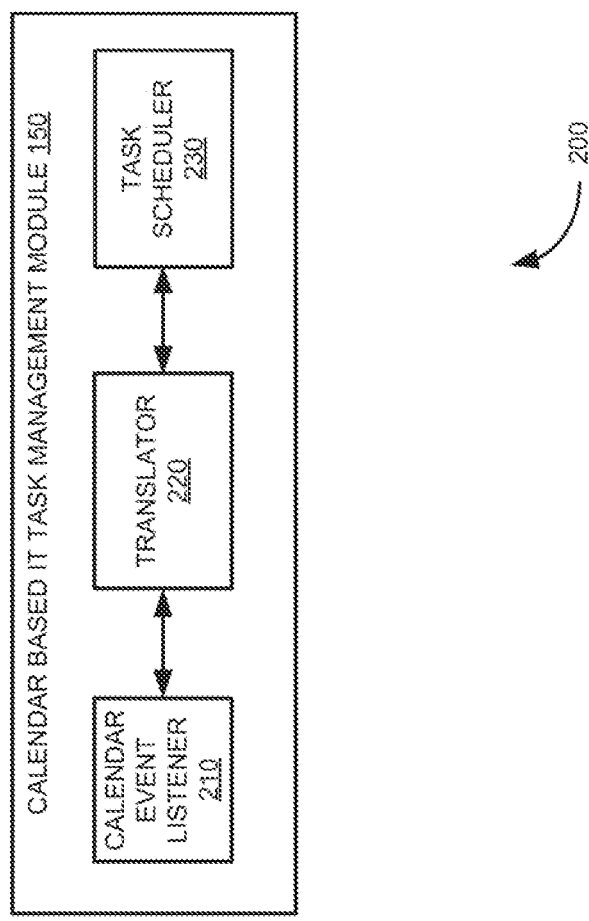
FIG. 2 is a block diagram illustrating major components of asynchronous processing module, such as those shown in FIG. 1, accordingly to an example embodiment.

FIG. 2 is a block diagram 200 showing some major components of calendar based IT task management module 150, such as those shown in FIG. 1, according to an example embodiment. As shown in FIG. 2, calendar based IT task management module 150 includes calendar event listener 210, translator 220, and task scheduler 230 that are communicatively coupled with each other.

In operation, an IT task for a target machine in the datacenter/cloud is scheduled by creating a calendar appointment using an at least one registered calendar application residing in a user device. Example IT tasks include scheduling parameters, such as start time, end time, start date, end date, IT task specific inputs based on predefined domain specific language keywords, future events and the like. Example predefined domain specific language includes type of IT task, blueprint/target machine details, priority, business group and so on. Example future events include repetitive provisioning and deploying of an IT task and/or releasing an IT task based on lease period to recover the computing resources.

For example, IT administrators may add appointments in calendar applications corresponding to the time and the specific automated deployments that may need to be issued/triggered. In these embodiments, the calendar entry may provide needed information, for example, activity type, blueprint/target machine details, business group and so on for calendar based IT task management module 130 to understand. For example, calendar entry of IT tasks may include "Deploy Blueprint Oracle_XYZ for Accounts-Group", "Scale-out Cluster Oracle_XYZ for DataBaseNode instances to 3" and so on. It can be envisioned that 'Domain Specific Language' may be used to create such calendar entries including 11 tasks and calendar wizards to assist IT administrators. In some embodiments, the default for the duration of the appointment may be configured to take as the lease period of the deployment. Calendar based IT task management module 150 may be also configured for users to provide in formation, such as lease period for the deployments, after the lease period ends the IT task may be automatically deleted and resources are released back to the pools to ensure the resources are freed up after the usage.

Further in operation, calendar event listener 210 residing in calendar based IT task management module 150 monitors the registered calendar applications for the scheduled IT task. One example operation of the calendar event listener 210 is shown in more detail in FIG. 4. In these embodiments, the calendar event listener 210 monitors the configured calendars for the scheduled IT tasks.

Furthermore in operation, translator 220 residing in calendar based IT task management module 150 translates the scheduled IT task into an action/command based on the outcome of the monitoring. In some embodiments, translator 220 translates the scheduled IT task into appropriate actions. One example operation of the translator 220 is shown in more detail in FIG. 4.

Also in operation, task scheduler 230 residing in calendar based IT task management module 150 is configured to issue the action/command to manage a target system 170 in the datacenter/cloud 160. One example operation of the task scheduler 230 is shown in more detail in FIG. 4. In some embodiments, task scheduler 230 may issue commands to VMS 140 to perform the scheduled IT task as defined in calendar entry when calendar event reaches the scheduled due date. Further in these embodiments, task scheduler 230 may also make the calendar entry for future events in case user has defined options like lease period to recover the resources, and so on to ensure that no user intervention is needed for cleaning up of resources allocated and/or also to make calendar entry for the cleanup.

Further, task scheduler 230 may be designed to be aware of the configured calendar, its authentication techniques and login information and its administrator/user to choose appropriate resources to deploy any needed new services. Moreover the org/group details can also be included as part of the calendar entry. It can also be envisioned, that the above technique may be extended for repetitive tasks and tasks requiring many steps and have to be performed as a part of a workflow. For example, an administrator may require all the computing resources in the datacenter/cloud to be maintained regularly h taking snapshots of the machines as well as applying regular patches. This can be configured to be part of a workflow developed in a workflow engine like VMWare® vCenter Orchestrator (vCO)®. By creating recurring appointments in the calendar, an administrator ma fully automate a repetitive task from the calendar by creating and adding the workflow name to the recurring appointment in the calendar.

In some embodiments, calendar based IT task management module 150 determines whether a scheduled IT task is repetitive. If the IT task is determined to be repetitive, then the task scheduler 230 repetitively issues action/command to carry out the associated IT task in the datacenter/cloud 160 based on the scheduled date and time.

Also, although certain terms are used primarily herein, other terms could be used interchangeably to yield equivalent embodiments and examples. For example, the term "host computing, system" may be used interchangeably with "physical host", "physical machine" or "physical device". Further for example, it is well-known that equivalent terms in the field of system virtualization or similar or related fields could be substituted for such terms as "physical computer," "hypervisor," "virtual machine," or the like. Furthermore, the terms "virtual computing environment"

and "virtual datacenter" are used interchangeably throughout the document. Also, the terms "interpreter" and "translator" are used interchangeably throughout the document. In addition, the terms "dynamic" and "automatic" are also used interchangeably throughout the document. Moreover, the terms "deploying" and "provisioning" are used interchangeably throughout the document. Moreover, the term "scheduling an IT task" refers to creating a calendar appointment to schedule an IT task using a calendar application.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to an particular routine, module, component, or the like.

Example Processes

Figure 3:
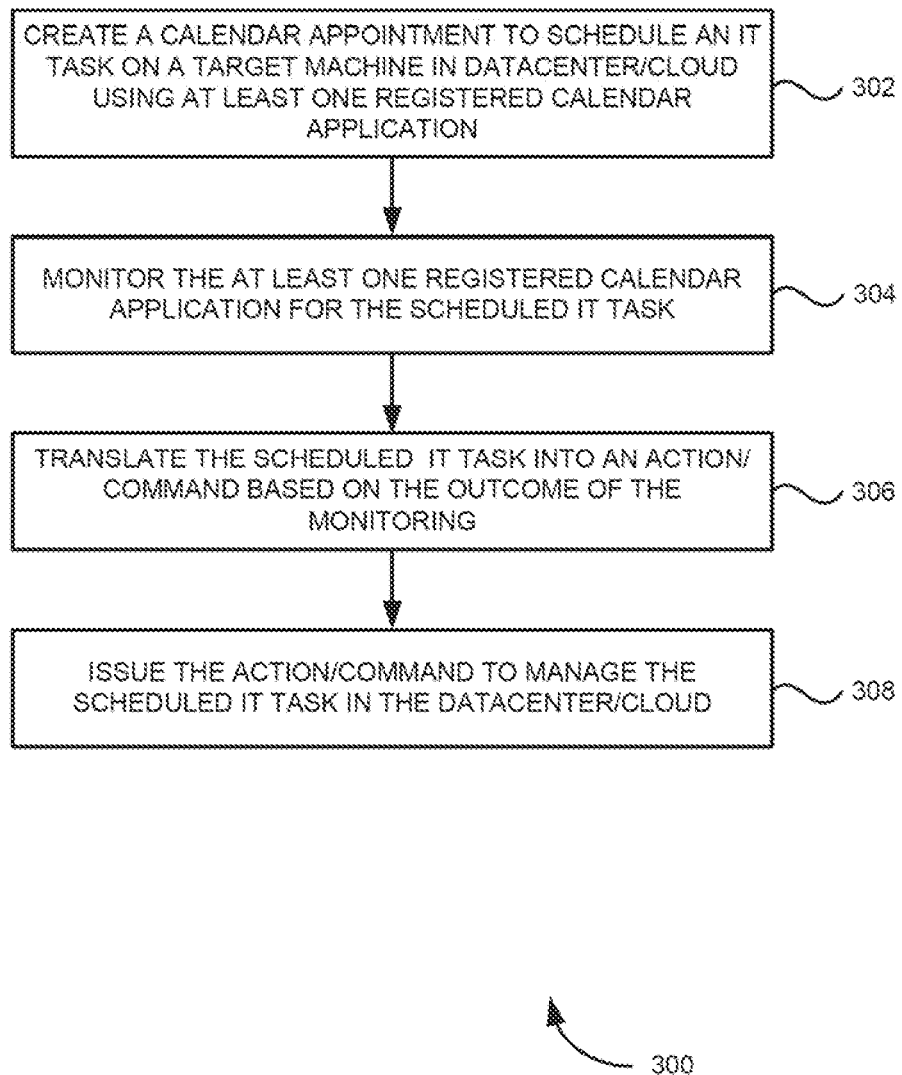
FIG. 3 is a flow diagram of a process for providing a calendar based provisioning and management for IT administrator/user activities, according, to an example embodiment.

FIG. 3 is a flow diagram of a process 300, for providing a calendar based provisioning and management for IT administrator/user activities in a virtual datacenter, according to an example embodiment.

At block 302, process 300 is creates a calendar appointment to schedule an IT task on a target machine in the datacenter/cloud using at least one registered calendar application residing in a user device. In some embodiments, one or more of the calendar applications residing in the user devices are registered with the organization's network. Example target machine is a computing system, network switch, storage device and the like.

In these embodiments, the scheduled IT task includes scheduling parameters, such as start time, end time, start date, end date, IT task specific inputs based on predefined domain specific language keywords, future events and the like. Further in these embodiments, the predefined domain specific language includes at least one of type of IT task, blueprint/target machine details, priority and business group. Also in these embodiments, the future events include repetitive provisioning and deploying of an IT task and/or releasing an IT task based on lease period to recover the computing resources.

Furthermore in some embodiments, process 300 determines whether the scheduled IT task is repetitive. Based on the outcome of the determination, if the task is found to be repetitive, then action/command associated with the IT task is repetitively issued for managing the scheduled IT task in the datacenter/cloud. Example datacenter is a virtual datacenter and Example cloud is a private cloud, public cloud or virtual cloud.

At block 304, the at least one registered calendar application is monitored for the scheduled IT task. At block 306, the scheduled IT task is translated into an action/command based on the outcome of the monitoring. At block 308, the action/command is issued to the datacenter/cloud to manage the scheduled IT task in the datacenter/cloud.

Figure 4:
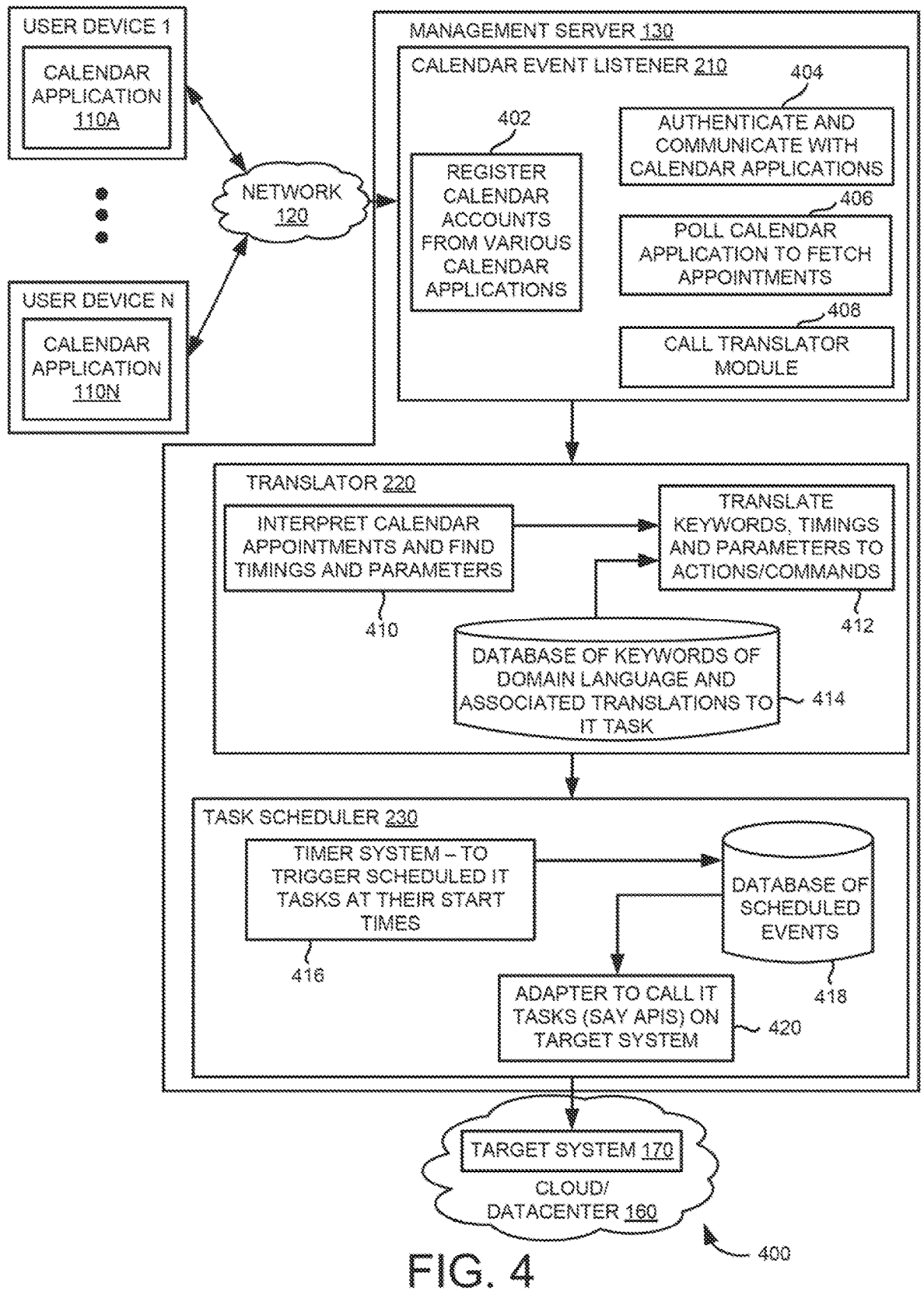
FIG. 4 is another flow diagram of process for providing a calendar based provisioning and management IT administrator/user activities, according to an example embodiment.

Process 300 for providing a calendar based provisioning and management for IT administrator/user activities is explained in more detail above with reference to the system diagrams 100, 200, and 400 shown in FIGS. 1, 2 and 4.

FIG. 4 is an example flow diagram of process 400 for providing a calendar based provisioning and management for IT administrator/user activities. Each of user devices 1-N may refer to any user operated computing device (e.g., mobile phone, tablet, laptop, and desktop) including a calendar application 110A-N (e.g. GOOGLE® Calendar ANDROID® Application, GOOGLE® Calendar Web Application, APPLE® Calendar iOS application on APPLE® phone, and YAHOO® Calendar Application on WINDOWS' phone) that can be accessed by the user over network 120. Each of the calendar applications 10A-N may include an authentication mechanism (e.g., username and password) to login into the system and create, view, modify, and delete calendar appointments to schedule an IT task on target machine 170 in datacenter/cloud 160. Network 120 may refer to an internet network or a private internal network within an organization. Cloud/datacenter 160 may refer to a pool of computing resources which allows multiple target systems to run by utilizing a subset of the computing resources managed by the cloud 160. Target system 170 may be an execution server hosted in cloud/datacenter 160 having a list of jobs that can be executed remotely by management server 130. For example, target system 170 may support installation of a specific application (e.g., Reports Application) if a remote server is connected to it and provides the name of the application to install.

Management server 130 may refer to any computing device within the organization's network that can access data of calendar applications 110A-N through network 120. Management server 130 may include computing hardware and/or software components (e.g., calendar event listener 210, translator 220, and task scheduler 230) to process the calendar appointments and convert them into scheduled IT tasks based on configuration set by an administrator.

Further, calendar event listener 210 manages calendar appointments. In one example, calendar event listener 210 registers calendar accounts from various calendars applications with the organization's network (e.g., block 402). For example, an administrator of management server 130 can add authentication details username and password) and connection/communication details (e.g. URL of calendar application) of a particular calendar application using calendar event listener 210. Further, calendar event listener 210 connects to a particular calendar application and fetches details of the calendar appointments created in the particular calendar application using the authentication details and connection/communication details of the particular calendar application (e.g., block 404). For example, the administrator can add many calendar accounts for different calendar applications and users. Furthermore, calendar event listener 210 allows the administrator to mention the polling interval (e.g., in seconds or minutes) after which the calendar application can be polled to fetch new or modified calendar appointments (e.g., block 406). Also, calendar event listener 210 calls translator module 220 and sends the fetched calendar appointment details to translator module 220 (e.g., block 408).

Further, translator 220 manages translation of calendar appointments. In one example, translator 220 interprets calendar appointments and determines timings and parameters (e.g., block 410). For example, translator 220 parses and interprets the fetched calendar appointments from their subject line (e.g., say subject line reads as "Deploy Reports Application") and timings (e.g., say start time of appointment as 10:00 am and end time as 11:00 pm) and send these inputs for translation.

Furthermore, the translator translates specific keywords in the inputs to actual system operations/actions/commands on the target system 170 using a database 414 of keywords of domain language and their translations to IT task (e.g., block 412). For example, keywords from the above example "Deploy Reports Application" may be translated to a remote procedure call on the target system 170 to execute a specific sub-routine "Deploy" which can install the specific application named "Reports" on the target system. Further, the start time of the appointment may be translated to the time of installation of the "Reports" application while the end time of the appointment may be translated to the un-installation of the same application. The translated operations can be sent to task scheduler 230 to generate necessary scheduled IT tasks to execute above operations. For example, the database 414 of keywords of domain language and their translations to IT task maintains a mapping between different keywords (e.g., in subject line of calendar appointments) and actual system operations to which they should be translated to. For example, "Deploy" keyword may be mapped to an "Install Application" operation on a specific target system (e.g., vREALIZE® Automation).

Also, task scheduler 230 manages the scheduled IT tasks for management server 130. Task scheduler 230 maintains a continuous timer system to trigger scheduled IT tasks at their start times (e.g., block 416) based on the translated operations. Database 418 of scheduled events maintains a database of all the scheduled IT tasks for use by the timer system. At each elapsed time interval (say every second) task scheduler 230 checks if any of the scheduled IT operations (e.g., say installation of "Reports" application) in the database has reached its start time. If so, task scheduler 230 calls the adapter module to perform that scheduled IT task on the target system 170. Further, the adapter module performs the actual execution of the scheduled IT task, including making a connection to the target system 170 and asking, a process on the target system to execute the specific job specified in the scheduled IT task (e.g., block 420). It can also be envisioned, that the above technique may be extended for repetitive tasks and tasks requiring many steps and have to be performed as a part of a workflow.

Figure 5:
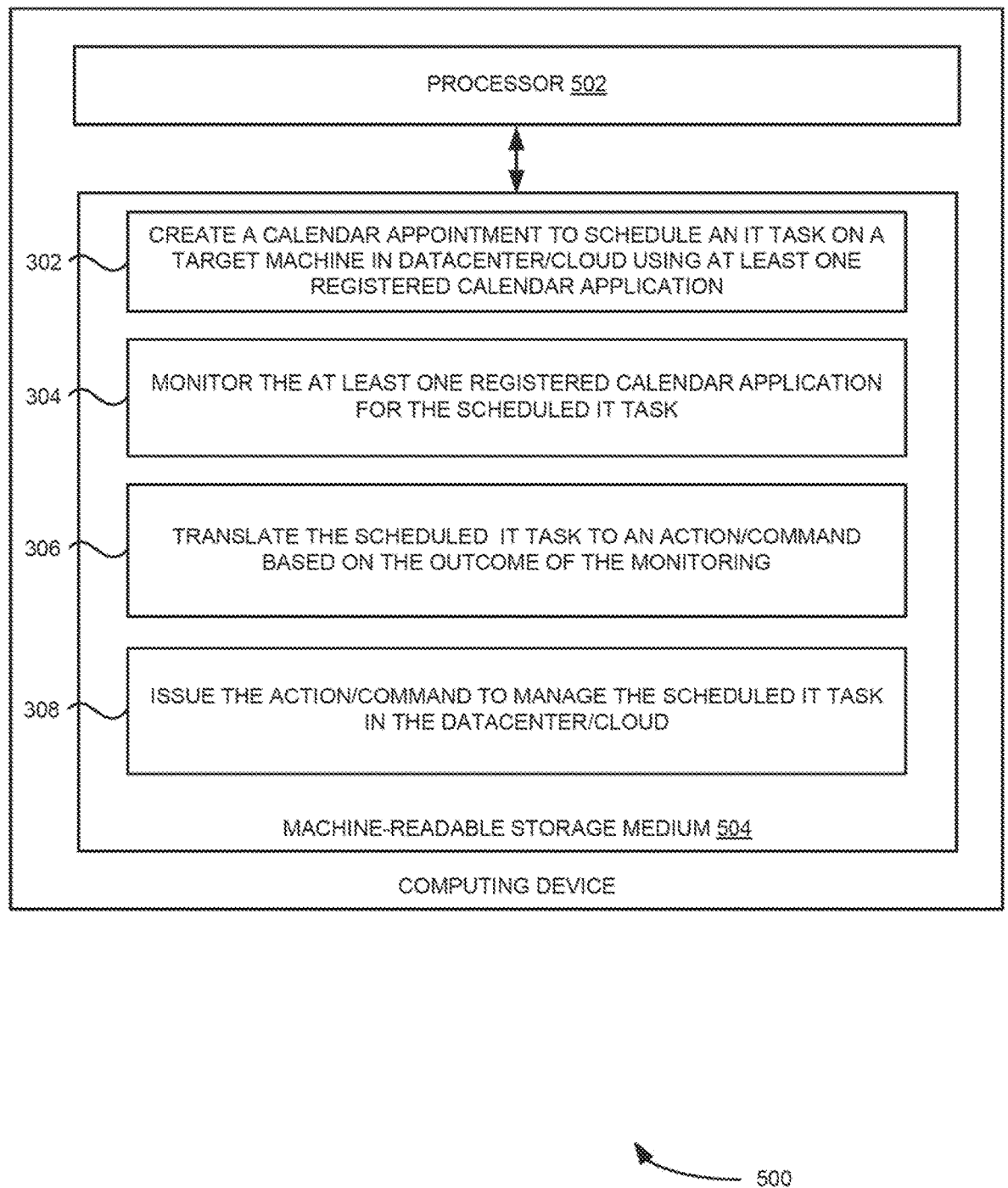
FIG. 5 illustrates a block diagram of an example computing device for providing a calendar based provisioning and management for IT administrator/user activities.

FIG. 5 illustrates a block, diagram of an example computing device 500 for providing a calendar based provisioning and management for IT administrator/user activities in a virtual datacenter. The computing device 500 includes a processor 502 and a machine-readable storage medium 504 communicatively coupled through a system bus. The processor 502 may be any type of central processing unit (CPU), microprocessor, or processing logic that interprets and executes machine-readable instructions stored in the machine-readable storage medium 504. The machine-readable storage medium 504 may be a random access memory (RAM) or another type of dynamic storage device that may store information and machine-readable instructions that may be executed by the processor 502. For example, the machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 504 may be a non-transitory machine-readable medium. In an example, the machine-readable storage medium 504 may be remote but accessible to the computing device 500.

The machine-readable storage medium 504 may store instructions 302, 304, 306, and 308. In an example, instructions 302, 304, 306, and 308 may be executed by processor 502 to provide a mechanism for providing a calendar based provisioning and management for IT administrator/user activities in a virtual datacenter. Instructions 302, 304, 306, and 308 may be executed by processor 502 to management of IT tasks in datacenter/cloud. Instructions 302, 304, 306, and 308 may be executed by processor 502 to increase efficiency and simplify a administrator's tasks by providing automatic scheduling capabilities for the repetitive IT tasks described above.

The architecture shown in FIGS. 1-5 may in some embodiments be partially or fully virtualized. For example, systems and methods (i.e., 100-500) shown in FIGS. 1 and 5, respectively, may be one or possibly many VMs executing on physical hardware and managed by a hypervisor. VM monitor, or similar technology. Also, multiple host computing systems may include virtualization logic to manage multiple VMs.

In an example embodiment, components/modules of VMS 140 and calendar based IT task management module 150 are implemented using standard programming techniques. In other embodiments, VMS 140 and calendar based IT task management module 150 may be implemented as instructions processed by a VM that executes as one of other programs. Even though the above technique is described with reference to calendar based IT task management module 150 being residing in VMS 140, which in turn is residing in management server 130, one skilled in the art can envision that calendar based IT task management module 150 can be residing, in another host computing system and/or a management server that manages and monitors the one or more virtual datacenters. In these embodiments, calendar based IT task management module 150 is configured to be a utility application that is not part of VMS 140 and further configured to obtain data from management software, such as VMS 140.

Furthermore, in some embodiments, some or all of the components of VMS 140 and calendar based IT task management module 150 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs") and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for optimizing guest OS utilization cost in a processor based licensing model in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating

The invention claimed is:

1. A method for calendar based management of IT (Information Technology) tasks in a datacenter, comprising:
registering, by a calendar based IT task management module residing in a management server, a calendar application residing in a user device using a calendar account, wherein the management server is to access the calendar application via a network;
enabling, by the calendar based IT task management module, to create a calendar appointment to schedule an IT task on a target machine in the datacenter using the registered calendar application residing in the user device, wherein the scheduled IT task comprises scheduling parameters selected from a group consisting of a start time, end time, start date, end date, IT task specific input, and future events;
establishing a connection, by the calendar based IT task management module, with the registered calendar application using authentication details and connection details of the calendar application;
monitoring, by the calendar based IT task management module, the registered calendar application according to a polling interval to fetch details of the calendar appointment upon establishing the connection;
translating, by the calendar based IT task management module, the scheduled IT task created as the calendar appointment in the registered calendar application into a command based on an outcome of the monitoring, comprising:
parsing and interpreting the scheduled IT task created as the calendar appointment in the registered calendar application from a subject line of the calendar appointment to generate a set of keywords;
mapping the set of keywords generated from the calendar appointment to a database of predefined keywords, wherein the database stein stores mapping information between the predefined keywords of domain specific language and actual system operations that perform the scheduled IT tasks; and
translating the set of keywords generated from the calendar appointment into the command that executes the actual system operations based on the mapping;
issuing the command to the datacenter for performing at least one of provisioning the IT task on the target machine and releasing the IT task on the target machine based on a lease period according to the created calendar appointment;
determining, by the calendar based IT task management module, whether the scheduled IT task is repetitive based on monitoring the calendar application and the future events; and
repetitively issuing the command associated with the scheduled IT task to the datacenter based on the outcome of the determination to automatically scale-in or scale-out datacenter resources.

2. The method of claim 1, wherein the future events comprise at least one of the repetitive provisioning of the IT task and/l releasing the IT task based on the lease period to recover computing resources.

3. The method of claim 1, wherein the datacenter is a cloud based virtual datacenter and the cloud is a private cloud, a public cloud, or a virtual cloud.

4. A non-transitory computer-readable storage medium including instructions that when executed by a processor of a management server, cause the processor to:
register a calendar application residing in a user device using a calendar account, wherein the processor is to access the calendar application via a network;
enable to create a calendar appointment to schedule an IT task for a target machine in a datacenter using the registered calendar application residing in the user device, wherein the scheduled IT task comprises scheduling parameters selected from a group consisting of a start time, end time, start date, end date, IT task specific input, and future events;
establish a connection with the registered calendar application using authentication details and connection details of the calendar application;
monitor the registered calendar application according to a polling interval to fetch details of the calendar appointment upon establishing the connection;
translate the scheduled IT task created as the calendar appointment in the registered calendar application into a command based on an outcome of the monitoring, comprising:
parse and interpret the scheduled IT task created as the calendar appointment in the registered calendar application from a subject line of the calendar appointment to generate a set of keywords;
map the set of keywords generated from the calendar appointment to a database of predefined keywords, wherein the database stores mapping information between the predefined keywords of domain specific language and actual system operations that perform scheduled IT tasks; and
translate the set of keywords generated from the calendar appointment into the command that executes the actual system operations based on the mapping;
issue the command to the datacenter for performing at least one of provisioning the IT task on the target machine and release the IT task on the target machine based on a lease period according to the created calendar appointment;
determine whether the scheduled IT task is repetitive based on monitoring the calendar application and the future events; and
repetitively issue the command associated with the scheduled IT task to the datacenter based on the outcome of the determination to automatically scale-in or scale-out datacenter resources.

5. The non-transitory computer-readable storage medium of claim 4, wherein the future events comprise at least one of the repetitive provisioning of the IT task and/or releasing the IT task based on the lease period to recover computing resources.

6. The non-transitory computer-readable storage medium of claim 4, wherein the datacenter is a cloud based virtual datacenter and the cloud is a private cloud, a public cloud, or a virtual cloud.

7. A computing system for providing calendar based management for IT tasks in a virtual datacenter, the system comprising:
multiple host computing systems in the virtual datacenter, wherein each host computing system hosts multiple Virtual Machines (VMs);
a management server coupled to the virtual datacenter;

a network; and one or more virtual IT infrastructure user devices coupled to the management server via a firewall and the network, wherein the management server comprises virtual management software (VMS), and wherein the VMS includes a calendar based IT task management module to:

register a calendar application residing in a user device using a calendar account, wherein the management server is to access the calendar application via the network;

enable to create a calendar appointment to schedule an IT task on a target machine in the virtual datacenter using the registered calendar application residing in the user device, wherein the scheduled IT task comprises scheduling parameters selected from a group consisting of a start time, end time, start date, end date, IT task specific input, and future events;

establish a connection with the registered calendar application using authentication details and connection details of the calendar application;

monitor the registered calendar application according to a polling interval to fetch details of the calendar appointment upon establishing the connection;

translate the scheduled IT task created as the calendar appointment in the registered calendar application into a command based on an outcome of the monitoring, comprising:

parse and interpret the scheduled IT task created as the calendar appointment in the registered calendar application from a subject line of the calendar appointment to generate a set of keywords;

map the set of keywords generated from the calendar appointment to a database of predefined keywords, wherein the database stores mapping information between the predefined keywords of domain specific language and actual system operations that perform the scheduled IT tasks; and translate the set of keywords generated from the calendar appointment into the command that executes the actual system operations based on the mapping;

issue the command to the datacenter for performing at least one of provisioning the IT task on the target machine and release the IT task on the target machine based on a lease period according to the created calendar appointment;

determine whether the scheduled IT task is repetitive based on monitoring the calendar application and the future events; and repetitively issue the command associated with the scheduled IT task to the virtual datacenter based on the outcome of the determination to automatically scale-in or scale-out datacenter resources.

8. The computing system of claim 7, wherein the future events comprise at least one of the repetitive provisioning of the IT task and/or releasing the IT task based on the lease period to recover the computing resources.

9. The computing system of claim 7, wherein the virtual datacenter is a cloud based virtual datacenter and the cloud is a private cloud, a public cloud, or a virtual cloud.

\* \* \* \* \*